No. 708,775. Patented Sept. 9, 1902.
A. & L. LUMIÈRE.
PANORAMIC PHOTOGRAPHIC APPARATUS.
(Application filed Mar. 20, 1901.)

(No Model.) 2 Sheets—Sheet 1.

WITNESSES
Ella L. Giles

INVENTORS
Auguste Lumière
Louis Lumière
BY
Richard
ATTORNEYS

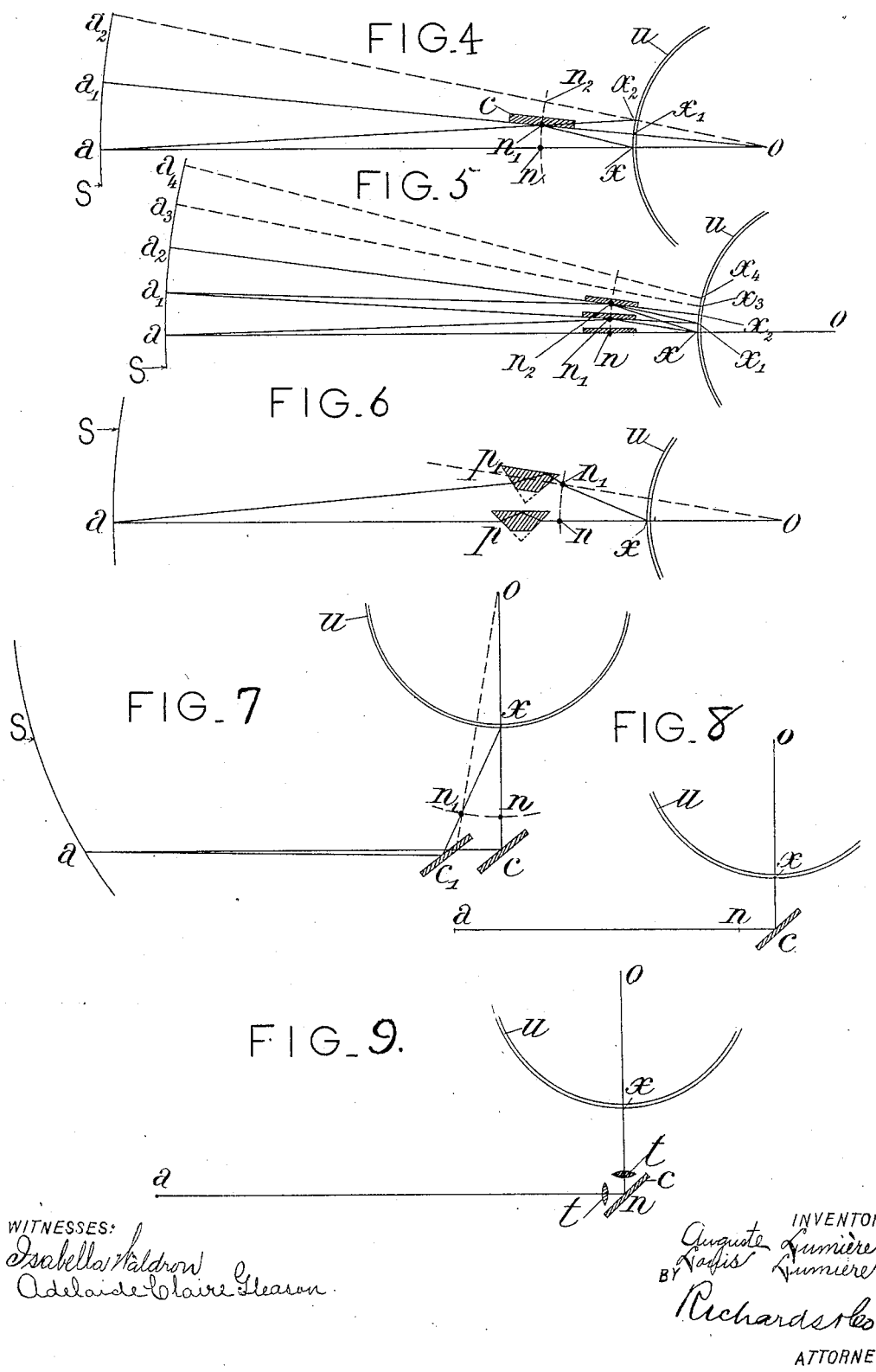

UNITED STATES PATENT OFFICE.

AUGUSTE LUMIÈRE AND LOUIS LUMIÈRE, OF LYON-MONPLAISIR, FRANCE.

PANORAMIC PHOTOGRAPHIC APPARATUS.

SPECIFICATION forming part of Letters Patent No. 708,775, dated September 9, 1902.

Application filed March 20, 1901. Serial No. 52,077. (No model.)

*To all whom it may concern:*

Be it known that we, AUGUSTE LUMIÈRE and LOUIS LUMIÈRE, citizens of France, residing at Lyon-Monplaisir, France, have invented certain new and useful Improvements in Panoramic Photographic Apparatus, of which the following is a full, clear, and exact description, and for which we have made applications for patents in France December 29, 1900, No. 306,172, and in Great Britain February 28, 1901, No. 4,309.

The present invention is designed to provide an improved apparatus for obtaining a panoramic image on a fixed cylindrical surface by the swinging motion of the objective, which objective is accompanied by a correcting device which maintains the image immovable with relation to said surface, notwithstanding the motion of the objective.

The invention is illustrated in the accompanying drawings, in which—

Figures 1, 3:
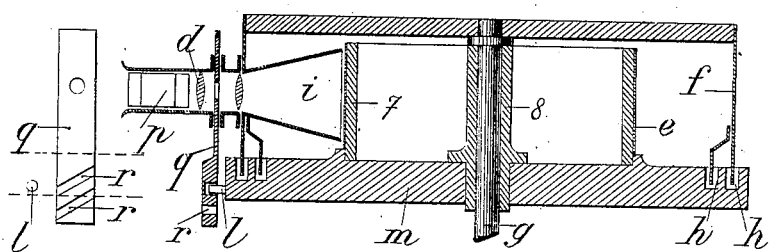
Figure 2:
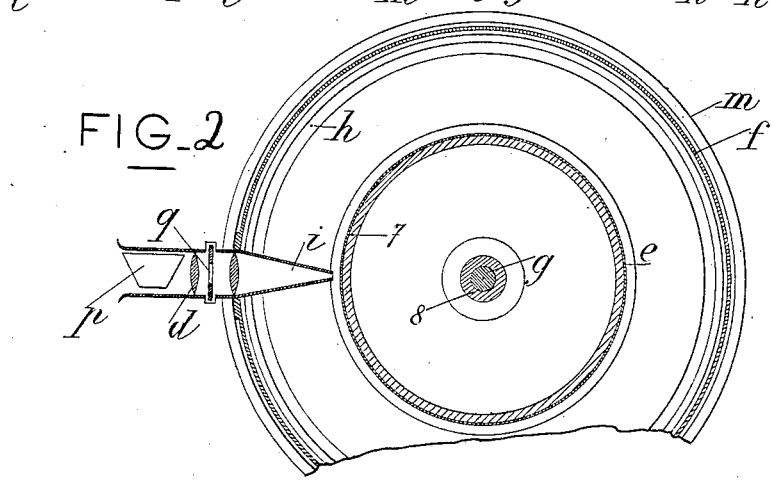

Figure 1 is a central vertical section. Fig. 2 is a horizontal section of the same. Fig. 3 is a detail view of the shutter, and Figs. 4 to 9 are diagrammatic views illustrating the action of various forms of correcting devices.

Referring more particularly to the drawings, a fixed plate $m$ carries the sensitive surface $e$ wound around a metal cylinder 7, and around this turns a concentric drum $f$, carrying at a point of its circumference the objective $d$, accompanied by a truncated prism $p$ or by any correcting arrangement fulfilling the same end. The drum $f$ is fixed to a shaft $g$, turning in a sleeve 8, fixed to the center of the plate $m$, and put in motion by hand or by any suitable mechanism. Its lower part is formed of two concentric edges entering without contact into a like number of annular grooves $h\ h$ of the plate in order to prevent any introduction of light without impeding the motion. In the interior a screen $i$ limits the field of the objective to a narrow rectangle having the height of the film. This screen allows only those rays to reach the film $e$ which form with the vertical plane passing through the axis of the object-glass angles which are small enough so that their reflection through the prism $p$ yields a practically exact and corrected picture. According to the following explanations regarding Fig. 2, it will be understood that that portion of the space which is limited by the small opening of the screen $i$ will form its picture in a corrected form on the lens $e$ and that if the cylinder $f$, which carries the object-glass and the screen, is made to turn the following portions of the space will form in their turn a straightened-up picture after the first one, so that after a complete revolution the film will have received a complete picture and a continuous one of the surrounding space. In order that the time during which it is exposed may be the same for all the parts of the film, it is of importance that the movement of the cylinder $f$ should be a uniform one and that the object-glass remains open not longer than exactly during one complete revolution, which can be done by means of the following arrangement:

An obturator $q$, having the form of a plate perforated by a hole at its upper part, slides vertically between the two lenses of an object-glass, causing friction which is strong enough to secure it in the position which has been given to it. At the lower part of plate $q$ are two grooves $r\ r$, Fig. 3, which can be actuated by means of a bolt-pin $l$, fixed to the immovable top plate $m$. This obturator can occupy all positions. In the central position—that is to say, the one shown in the design—the object-glass is open, while in the two positions at the upper and lower ends the object-glass is closed.

In order that our invention may be more clearly understood, reference will now be had to the diagrammatic views, Figs. 4 to 9.

Referring first to Fig. 4, the nodal point of the object-glass is indicated by letter $n$, by which point $a$ of the surface S will form its picture in $x$ on the film $u$. Further, the apparatus is so arranged as to obtain the proportion $\dfrac{o\ a}{o\ x}=\dfrac{n\ a}{n\ x}$. As the film remains fixed, when the object-glass $n$ is made to turn around the center $o$ as far as to the position $n'$, very near $n$, the picture of point $a$ will form in $x^2$ before the new axis $o\ a'$ of the object-glass. However, if by means of a proper reflection arrangement the ray $a\ n'$ is reflected in the direction $n'\ x$ the picture of $a$ will be secured in the fixed position $x$ while the object-glass $n\ n'$ moves over its course. Suppose that the way over which said object-glass travels is small enough, so that the arches $x\,x^2$, $n\,n^2$, $a\,a^2$ may be brought together with their chords which are parallel one to the other, then we will obtain in the triangle $o\,a\,a'$ $\frac{a\,a_1}{x\,x_1}=\frac{o\,a}{o\,x}$ and $\frac{a_1\,n_1}{n_1\,x_1}=\frac{n\,a}{n\,x}$. As $\frac{o\,a}{o\,x}=\frac{n\,a}{n\,x}$ has been obtained by construction, there results $\frac{a_1\,a_1}{x\,x_1}=\frac{a_1\,n_1}{n_1\,x_1}$. The rectangular triangles $a\,n'\,a'$ and $x\,n'\,x'$ are therefore alike, their angles in $n'$ are the same, and if a plane mirror C, the axis of which coincides with the axis of $o\,a'$ of the object-glass, is placed in $n'$ the ray $a\,n'$ will be reflected according to $n'\,x$, and the picture of point $a$ will form in point $x$—that is to say, the desired result has been in this manner obtained. Mirror S being invariably fixed to the object-glass, the picture of point $a$ will remain in $x$ while the object-glass $n\,n'$ moves over its entire course. If we consider now in Fig. 5 several points $a\,a'\,a^2$ of the surface S, we find that in the position $n$ of the object-glass the picture of $a$ forms directly in $x$. When the object-glass has arrived in $n'$, the picture of point $a'$ forms directly in $x'$, while the picture of $a$ continues to form by reflection in $x$. When the object-glass arrives in $n^2$, the picture of point $a^2$ forms directly in $x^2$, while the pictures of $a$ and of $a'$ continue to form by means of reflection in $x$ and $x'$. The picture of the surface $a\,a'\,a^2$ has therefore remained fixed on the film $u$. If the object-glass continues to move, the successive surfaces $a^2\,a^3$, $a^3\,a^4$ of the surface S will form in the same way their picture in $x^2\,x^3$, $x^3\,x^4$, and after a complete revolution of the object-glass the film $u$ will have received a complete picture of the surface S of the space. As the preceding demonstration can only be applied to an angular limited field, it will be necessary to intercept, by means of a screen $i$, Figs. 1 and 2, the rays which may arrive in the object under a larger angle than that which has been admitted as limit. The mirror C, Fig. 4, which passes through the nodal point of the object-glass, and we have allowed this in order to simplify the demonstration, is of no practical use. However, there are other means to reflect the rays under the required conditions either before or after they have passed into the object-glass. To this effect there may be placed before the object-glass $n$, Fig. 6, an isoscele prism with total reflection, the reflecting-surface of which is parallel to the plane passing through the axis $o\,a$ and through the axis of revolution $o$. This prism causes no deviations of the rays, such as $a\,p\,x$, parallel to its reflecting-surface. However, it causes to deviate the inclined rays, such as $a\,p'$, in the same manner as if they were reflected by means of a plane mirror. It would be even simpler to place before the object-glass $n'$, Fig. 7, a mirror $c$, inclined at an angle of forty-five degrees on the axis of this object-glass. In this case the point $a$ would form its picture in $x$ after a reflection on $c$, and this picture would still remain stationary during the passing of the object-glass from $n$ and $n'$. In this case the broken ray $a\,c\,n$ replaces the direct ray $a\,n$ of Fig. 4, and the ratio which is needed to obtain the result is:

$$\frac{o\,c+c\,a}{o\,x}+\frac{n\,c+n\,a}{n\,x}.$$

The mirror $c$ can be placed behind the object-glass $n$, Fig. 8. The broken ray $n\,c\,x$ replaces then the direct ray $n\,x$ of Fig. 4, and the following ratio is obtained:

$$\frac{o\,c+c\,a}{o\,x}=\frac{n\,a}{n\,c+c\,x}.$$

The mirror $e$ can also pass through $n$, Fig. 9—that is to say, it can be placed between the two lenses $t\,t$ of the bent object-glass, the axis of which is $o\,n\,a$. The ratio obtained in this case is:

$$\frac{o\,n+n\,a}{o\,x}+\frac{n\,a}{n\,x}.$$

Finally in the three cases represented in Figs. 7, 8, 9 the reflecting-surface of the mirror $c$ can be replaced by that of a prism with total reflection.

It will be understood that the arrangements shown in the drawings are only given by way of example and may be varied as desired without departing from the spirit of our invention.

What we claim as our invention, and desire to secure by Letters Patent, is—

1. In a panoramic camera, the combination with the rotating case, of means for supporting a sensitive surface therein in circular position, a lens and shutter carried by the outer periphery of said case, and means for deflecting the rays of light prior to their entering said lens, substantially as described.

2. In a panoramic camera, the combination with a circular rotating case, of means for supporting a film therein in a vertical position concentric with the case, an objective in the outer peripheral wall of said case having a suitable shutter, a screen within the case limiting the range of the light-rays, and deflecting means for deflecting the rays of light prior to their entering the objective, substantially as described.

3. In a panoramic camera, the combination with a rotating case having means for supporting a sensitive surface in circular position within the case, of a lens and shutter carried by said case and adapted to swing around said sensitive surface in a path concentric therewith, and means for deflecting the rays of light in a plane parallel with the line of movement of the lens, substantially as described.

4. In a panoramic camera, the combination with the case having means for supporting a sensitive surface therein in circular position, of a lens swinging concentric with said circular surface, a swinging light-confining screen extending from the lens toward the sensitive surface and terminating in a narrow slit in proximity to said surface, said slit being arranged at right angles to the line of movement of said screen, and light-deflecting means in proximity to said lens arranged to deflect the light which enters said lens in a plane at right angles to said narrow slit, substantially as described.

In witness whereof we have hereunto set our hands in presence of two witnesses.

AUGUSTE LUMIÈRE.
LOUIS LUMIÈRE.

Witnesses:
GASTON JEANNIAUX,
THOS. N. BROWNE.